United States Patent [19]

Kajimoto et al.

[11] Patent Number: 5,042,567
[45] Date of Patent: Aug. 27, 1991

[54] AIR CONDITIONER FOR A VEHICLE

[75] Inventors: Shinshi Kajimoto; Seizi Hirano, both of Hiroshima, Japan

[73] Assignee: Mazda Motor Corporation, Hiroshima, Japan

[21] Appl. No.: 343,545

[22] Filed: Apr. 21, 1989

[30] Foreign Application Priority Data

Apr. 21, 1988 [JP] Japan .................................. 63-98694
Apr. 29, 1988 [JP] Japan ................................. 63-108015

[51] Int. Cl.[5] ............................................. B60H 1/00
[52] U.S. Cl. ........................................ 165/42; 98/2.03; 98/2.11; 165/43
[58] Field of Search ................... 98/2, 2.03, 2.05, 2.06, 98/2.08, 2.11; 165/42, 43; 237/12.3 A

[56] References Cited

FOREIGN PATENT DOCUMENTS

| 57-46007 | 8/1955 | Japan . | |
| 149819 | 8/1984 | Japan | 98/2.11 |
| 61-67617 | 4/1986 | Japan . | |
| 1335779 | 9/1987 | U.S.S.R. | 98/2.05 |

Primary Examiner—Harold Joyce
Attorney, Agent, or Firm—Wenderoth, Lind & Ponack

[57] ABSTRACT

At least two blowoff duct which discharge conditioning air into a car interior have separate individual channels. At least one of the blowoff ducts is a main duct which communicates with a heating device or a cooling device, and the remaining ducts are auxiliary ducts. A heat conductor is arranged in each blowoff duct and the heat conductors are connected conductively by a heat pipe. Heat energy of the conditioning air in the main duct which was heated by the heating device or cooled by the cooling device is transmitted to conditioning air in the auxiliary duct by the heat pipe and heat conductors so as to heat or cool the air in the auxiliary duct. The heat pipe may be made to be rotatable by a driving device, and a heat conductor in the auxiliary duct is a blowing fan. Air conditioning to the area surrounding a rear seat is achieved by arranging a heat pipe between right and front seats in the car interior and by forming a heat conductor at the rear end of the blowing fan.

22 Claims, 6 Drawing Sheets

AIR CONDITIONER FOR A VEHICLE

BACKGROUND OF THE INVENTION

1. Field of the Invention

This invention relates to an air conditioner for an automotive vehicle, and especially relates to a technique of reducing the space required to be occupied by blowoff ducts.

2. Description of the Prior Art

Conventionally, an air conditioner for a vehicle such as a car comprises a blower unit with an air blower, a cooler unit with an evaporator and a heater unit with a heater core which are connected with one another in series, as disclosed by Japanese Patent Application Laying Open Gazette No. 61-67617, for example. According to this air conditioner, the air sent from the blower unit is cooled by the cooler unit or heated by the heater unit for adjustment to a target temperature and such adjusted air is blown out through a heater blowoff nozzle, a ventilating blowoff nozzle and a defrosting blowoff nozzle in fixed blowing off modes into the interior of a car for regulation of the interior temperature to a comfortable temperature, ventilation, defrosting of window, glass, etc.

In general, the ventilating blowoff nozzle is opened at three places, namely, right and left opposite ends and a center of an instrument panel which is located at the front part of the care interior on the other hand, the heater unit is arranged substantially at the center between right and left sides of a body of the car and communicates with each ventilating blowoff nozzle via a connecting duct.

Such a connecting duct, however, has a comparatively large diameter for flowing the conditioning air at a high flow rate. Therefore, a comparatively large amount of space is occupied by the connecting ducts, thereby causing difficulties in fitting other various parts to be installed in the instrument panel, such as meters, steering fitting mechanism, glove box, etc., and the arrangement, layout, design and shape of the instrument panel itself are restricted.

In a construction where the air conditioning unit is arranged at the front part of a car interior and the conditioning air is blown out only through front blowoff nozzles, the air conditioning of the area adjacent a rear seat in the rear part of the car interior is not satisfactory. In order to make up for such lowering of the air conditioning function in the rear area, it is suggested to arrange a blowoff nozzle for the rear seat at the center of a floor member in the car interior and to connect the blowoff nozzle and the air conditioning unit at the front part of the car interior by a connecting duct so that the conditioning air also can be discharged through such blowoff nozzle toward the rear seat, as disclosed by Japanese Utility Model Registration Laying Open Gazette No. 57-46007.

However, in the above construction also, the blowoff nozzle for the rear seat must be of large size due to the space occupied by the connecting duct, with the result that the space available for the car interior is reduced and the layout of other parts to be installed in the car interior is restricted.

The present invention has been made in view of the above problems and has for its object to dispense with a connecting duct which occupies a large area, to increase the amount of space available for other parts in the instrument panel, and to improve the flexibility of arrangement and layout of such parts by improving the air blowoff construction of an air conditioner for a vehicle.

Another object of the present invention is to dispense with a connecting duct which connects the air conditioning unit at the front part of a car interior to a blowoff nozzle for a rear seat of the car and to discharge comfortable conditioning air which is controlled for temperature and humidity toward the rear seat, thereby improving the air conditioning function to the rear seat.

SUMMARY OF THE INVENTION

In order to achieve the above objects in accordance with the present invention at least two blowoff ducts are arranged for blowing the conditioning air into a car interior and each blowoff duct blows the conditioning air by a separate individual blowing channel. At least one of the blowoff ducts communicates with a heating means or a cooling means. A heat conductor is provided in each duct and heat conductors are connected with each other by a heat pipe in such a fashion that heat is conductible therebetween.

In the case where an air conditioner is installed at the front part of a car interior, plural blowoff nozzles are arranged in a row in the right and left direction of a body of the car, and a heat pipe is arranged in such a fashion that is extends in the right and left direction of the car body in the instrument panel which is at the front of the car interior.

In order to raise the heat exchange efficiency, the heat conductor is made in a fin-like shape and it is preferable that the heat conductor is arranged in parallel with the blowing direction in the blowoff duct.

At least one of the blowoff ducts is made an auxiliary duct which does not communicate with a heating means or a cooling means. In order to introduce travelling air by the auxiliary duct, the auxiliary duct is made to communicate with a part which receives travelling air pressure when the vehicle is running.

It is possible to arrange a blower fan in the auxiliary duct so that blowing in the auxiliary duct is achieved by such blower fan. In order to have the auxiliary duct draw air into the car and discharge such drawn in air, the blower fan of the auxiliary duct and a part of the auxiliary duct upstream of the heat conductor are made to communicate with the car interior. In order to have the auxiliary duct draw in and discharge outside air or inside air selectively, a switchover door or flap valve selectively communicates the upstream end of the auxiliary duct with the inside or outside of the car interior is provided.

In order to dispense with a connecting duct between the air conditioning unit at the front part of the car interior and the blowoff nozzle for the rear seat and to improve the air conditioning function for the rear seat area, an air conditioning unit is arranged at the front part of the car interior, an auxiliary duct is arranged at the rear part of the car interior and a heat pipe is arranged in such a fashion that it extends from the air conditioning unit to the auxiliary duct. In this case, it is desirable that the heat pipe is arranged in such a fashion that it extends toward the rear seat from between right and left front seats. A blowoff nozzle which opens toward the rear seat is arranged at the auxiliary duct. A driving means supports the heat pipe rotatably and rotates it. If a blower fan is formed by a heat conductor fixed to the heat pipe, there is no need of providing a blower fan separately, and the air conditioner can be made more compact planned.

BRIEF DESCRIPTION OF THE DRAWINGS

The nature and advantages of the present invention will be made more apparent from the following description made with reference to the accompanying drawings, in which:

FIG. 1 through to FIG. 6 show a first embodiment of the present invention, of which

FIG. 7 through to FIG. 9 show a second embodiment of the present invention, of which

DESCRIPTION OF THE PREFERRED EMBODIMENTS

Embodiments of the present invention will be explained below with reference to the accompanying drawings.

Figure 1:
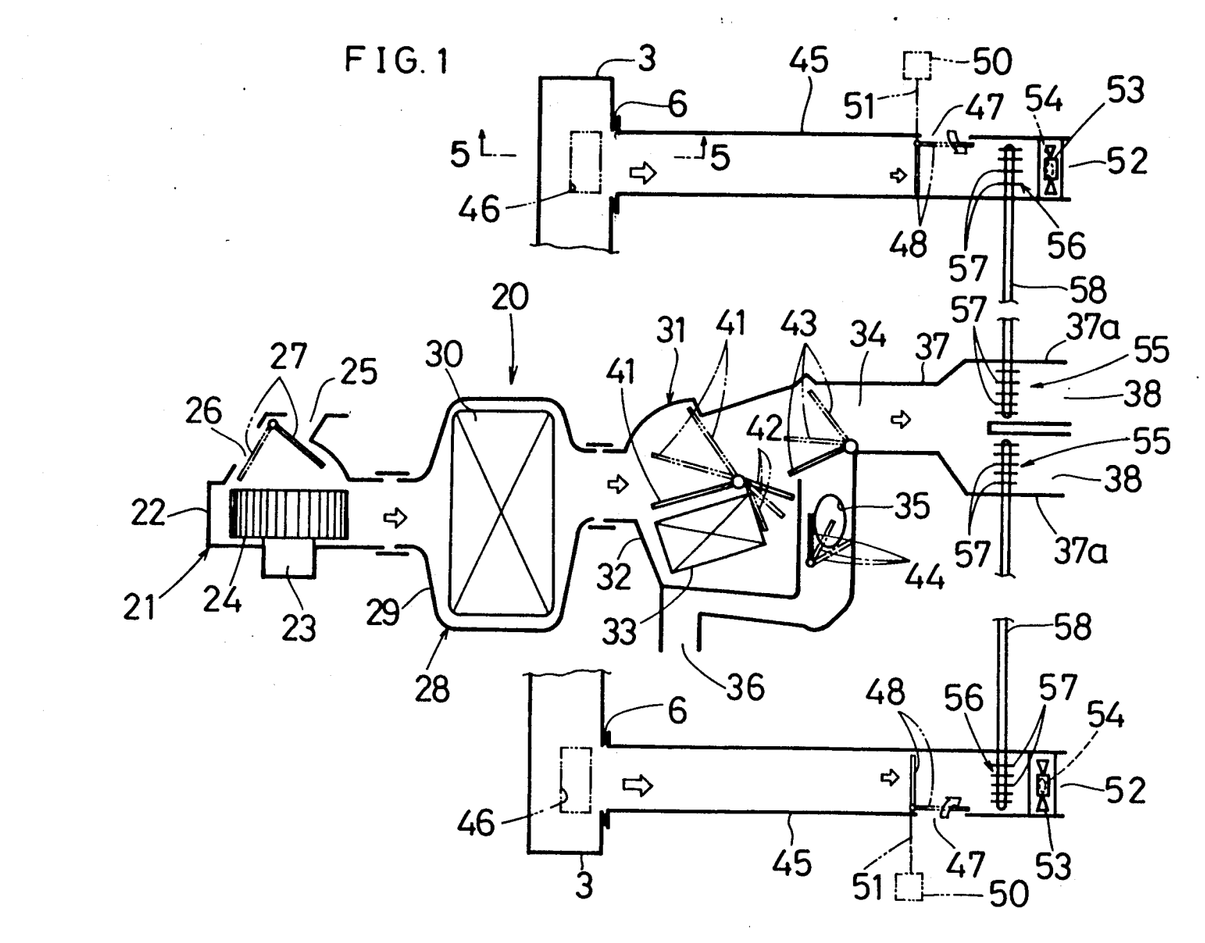
FIG. 1 is a cross section showing the typical composition of an air conditioner as a whole.
Figure 2:
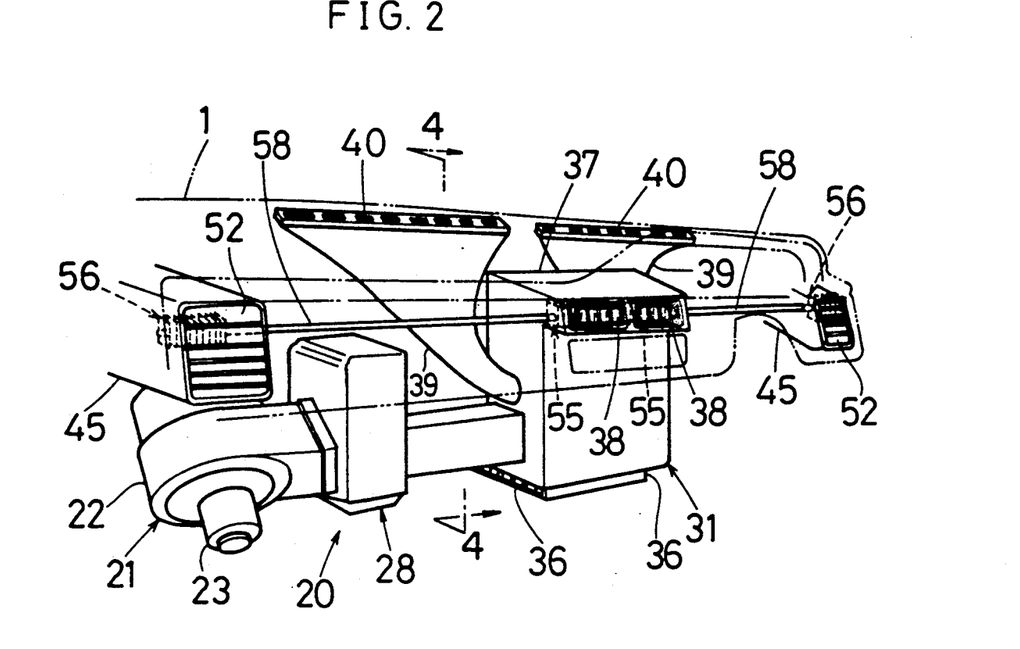
FIG. 2 is a perspective view of the arrangement of an air conditioner in an instrument panel.
Figure 4:
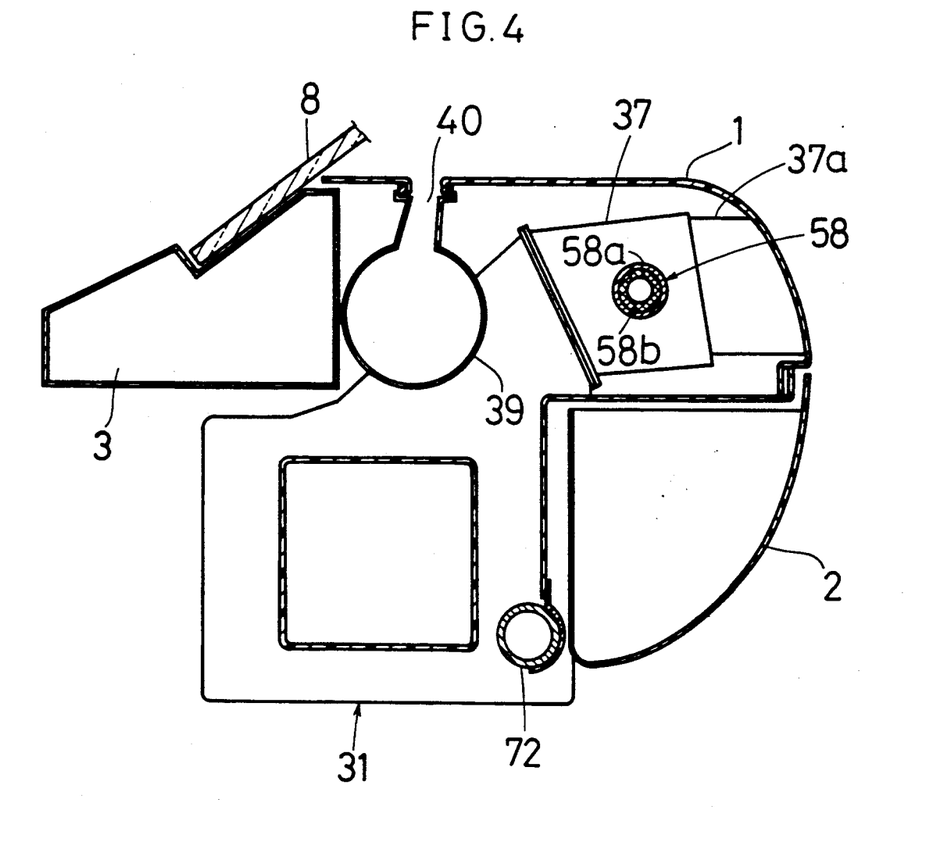
FIG. 4 is a cross section, on an enlarged scale, taken along the line 4—4 in FIG. 2.

In FIG. 2 and FIG. 4, reference numeral 1 designates an instrument panel arranged at a front end of a driver compartment of a car and reference number 2 designates a glove box arranged at the left end portion of the instrument panel 1. An air conditioning unit 20 is arranged at the lower part (inside) of the instrument panel 1. As shown in FIG. 1, the air conditioning unit 20 comprises a blower unit 21, a cooler unit 28 and a heater unit 31. The blower unit 21 is fitted to a lower part of the left end of the instrument panel 1. A blower 24 which is an air blowing means to be driven by a blower motor 23 is enclosed in a case 22 of the blower unit 21. Cooler unit 28 is arranged on the right side of the blower unit 21 and a case 29 of the cooler unit 28 is connected to the case 22 of the blower unit 21. An evaporator 30 which is a cooling means is disposed in the case 29. An expansion valve, a compressor which is driven by an engine of the car, a receiver tank and a condenser (all of which are not shown in the drawings) communicate with the evaporator 30 in series through the medium of a refrigerant piping. Refrigerant compressed by the compressor is liquefied by condensation by the condenser and after such liquid refrigerant expands by the expansion valve, it evaporates by the evaporator 30 and the air is cooled by the heat of such evaporation.

Heater unit 31 is arranged at the lower part of the instrument panel 1. A case 32 of the heater unit 31 is connected to the case 29 of the cooler unit 28. A heater core 33 as a heating means is disposed in the case 32 and communicates with a water jacket of the engine through the medium of a piping for cooling water (now shown in the drawings). Cooling water, the temperature of which is increased by the cooling of the engine, is supplied to the heater core 33, where the air is heated by the heat radiation.

Formed at the case 22 of the blower unit 21 are an open air introducing port 25 which communicates with the outside of the car and an inside air introducing port 26 which communicates with the inside of the car. An inside air/outside air switchover door or flap valve 27 which opens or closes the outside air or the inside air ports selectively and introduces it into the case 22 is supported revolvably by the case 22 between introducing ports 25, 26.

Provided at the case 32 of the heater unit 31 are a communicating port 34 for ventilating, a communicating port 35 for defrosting and heat blowoff nozzles 36. Each of the heat blowoff nozzles 36 is opened toward the feet of a person in the driver compartment of the car. On the other hand, connected to the communicating port 34 for ventilating is an upstream end of a first duct 37 for ventilating which forms a blowoff duct. The downstream portion of the duct 37 branches into right and left branch ducts 37a and each downstream end portion communicates with center louver blowoff nozzles 38 which open toward the breast of a person in the driver compartment of the car. These two center louvers 38 are arranged side by side at the central part of the instrument panel 1, as shown in FIG. 2.

Connected to the communicating port 35 for defrosting is an upstream end of a duct 39 for defrosting as shown in FIG. 2. The downstream end portion of the duct 39 communicates with two right and left blowoff nozzles 30 for defrosting which open toward the direction of a front window glass 8.

An air mix door or flap valve 41 for regulating the temperature of the air blown into the interior of the car and an auxiliary door or flap valve 42 are supported revolvably in the case 32 of the heater unit 31. These two doors 41, 42 are opened and shut simultaneously by being linked with each other so that the channel area in relation to the heater core 33 is controlled and accordingly the blowoff air temperature is regulated.

A ventilating door or flap valve 43 for opening and shutting the communicating port 34 for ventilating and a defrosting door or flap valve 44 for opening and shutting the communicating port 35 for defrosting are supported revolvably in the case 32 of the heat unit 31. These two doors 43, 44 are opened and shut simultaneously by being linked with each other so that opening and shutting of each door 43, 44 is controlled for switching in accordance with a fixed pattern and a blowoff mode is switched on or off. By the switchover control of opening and shutting of the doors 27, 41-44, the inside air or the outside air taken into the blower unit 21 is cooled or heated by the cooler unit 28 and the heater unit 31 respectively and then the air thus treated is blown into the interior of the car through the blowoff nozzles 36, 38, 40. Thus, the air in the interior of the car is climate controlled to a comfortable state.

Figure 5:
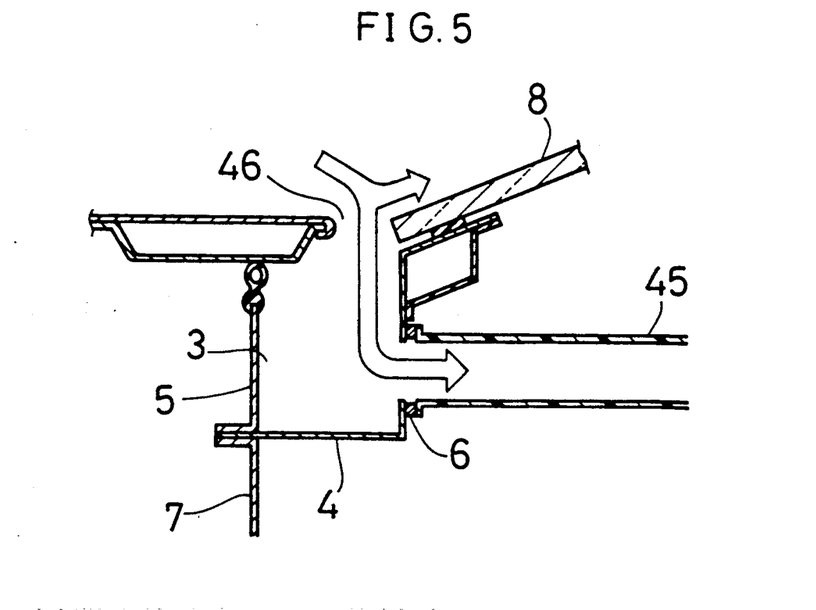
FIG. 5 is a cross section, on an enlarged scale, taken along line 5—5 in FIG. 1.

At both the right and left end portions of the instrument panel 1, there are provided second blowoff ducts 45 for ventilating (as auxiliary ducts in the present invention). Each duct 45 extends in lengthwise direction of the car body and its cross sectional shape is substantially rectangular. A forward end of each duct 45 communicates with the inside of a cowl box 3, through the medium of sealing material 6, which is located between the interior of the car and the engine compartment in front of the driver compartment of the car. As shown in FIG. 5, this cowl box 3 is formed in a closed section by a dash upper panel 4 and a cowl lower panel 5. At the upper surface of the cowl box 3, namely that portion which is subjected to travelling wind pressure while the car is being driven opens an outside air introducing port 46. Therefore, a forward end of each of the second ducts 45 for ventilating communicates with that portion which is subjected to travelling wind pressure outside the car. In FIG. 5, reference numeral 7 designates a dash lower panel. In FIG. 4, reference numeral 72 designates a support member of the instrument panel 1.

Figure 3:
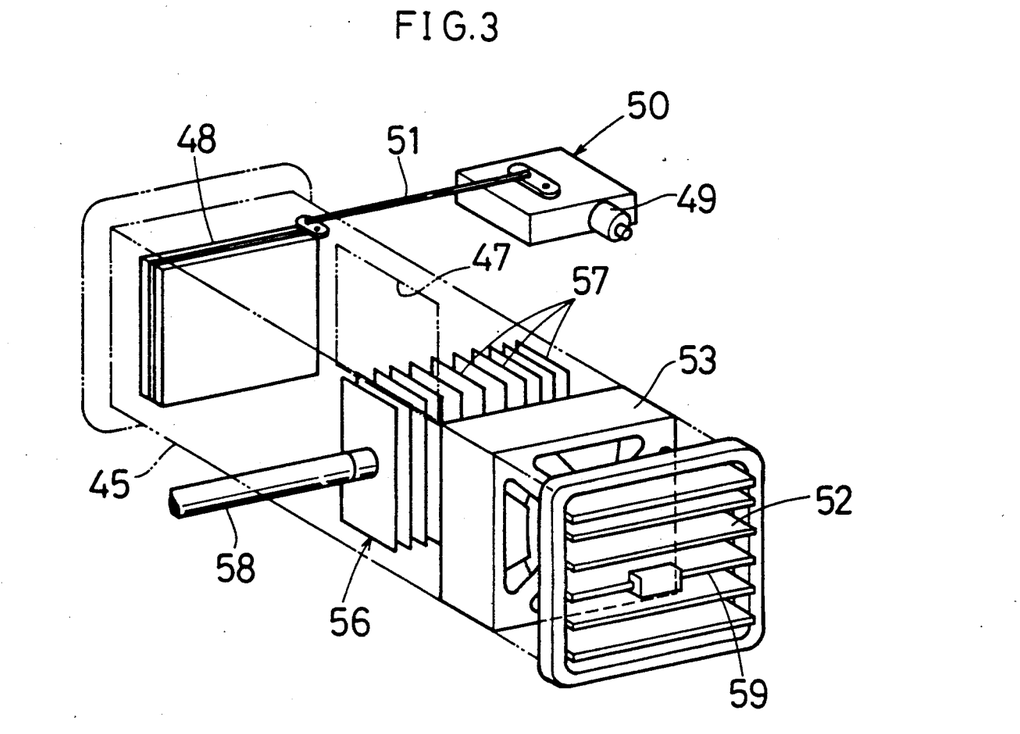
FIG. 3 is a perspective view showing the construction of the inside of a duct for right side ventilation, shown on an enlarged scale.

At the side surface of each of the ducts for ventilating (left side surface in the case of the left duct 45 and the right side surface in the case of the right duct 45), opens an inside air introducing 47. An inside air/outside air switchover door or flap valve 48 is supported revolvably at a position adjacent to the introducing port 47. This door 48 is connected to an actuator 50 having a motor 49 through the medium of a link 51. By selective operation of the actuator 50, outside air or inside air is introduced into the duct 45.

At a rear end of each duct 45 for ventilating, there is formed a side louver blowoff nozzle 52 which opens toward the direction of the breast of a person in the driver compartment of the car. As shown in FIG. 2, the two blowoff nozzles 52 are arranged at opposite end portions of the instrument panel 1.

FIG. 3 illustrates the duct 45 on the right side on an enlarged scale, and in each duct 45 is provided a brushless fan 53 as a blowing means in front of the respective side louver blowoff nozzle 52. Fan 53 has an interval motor 54, and by the operation of fan 53, outside air taken in from the outside air introducing port 46 or inside air taken in from the inside air introducing port 47 is blown out into the interior of the car through the side louver blowoff nozzle 52. Under the above arrangement, the first ventilating duct 37 and the second ventilating duct 45 are so composed that the conditioning air is blown into the car interior through respective individual blowing channels. Only the first duct 37 communicates with the heater core 33 (heating means) or the evaporator 30 (cooling means).

In the inside of each branch duct 37a of the first duct 37 and immediately upstream of the respective center louver blowoff nozzle 38 is arranged a first hat conductor 55. In the inside of each second duct 45 and immediately upstream the brushless fan 53 is arranged a second heat conductor 56. These heat conductors 55, 56 are of the same construction and each comprises a plurality of heat conducting fins 57 which are rectangular aluminum plates, for example, arranged at regular intervals and in parallel with the blowing direction in the ducts 37, 45. Heat conducting fins 57 are fixed to an supported by respective opposite end portion of a heat pipe 58. Each of the heat pipes 58 passes through the side walls of the respective ducts 37, 45 and conductively connects the respective first heat conductor 55 and the second heat conductor 56. More particularly, the inner end portion of the heat pipe 58 on the left side passes through the left side wall of the respective duct 37a and into such duct 37a, and the other end portion of the left heat pipe 58 is located immediately upstream of the respective brushless fan 53 after passing through the right side wall of the left side second duct 45. On the other hand, the inner end portion of the heat pipe 58 on the right side extends into thee right side branch duct 37a after passing through the right side wall thereof, and the outer end portion is located immediately upstream the respective brushless fan 53 after passing through the left side wall of the right side second duct 45.

Figure 6:
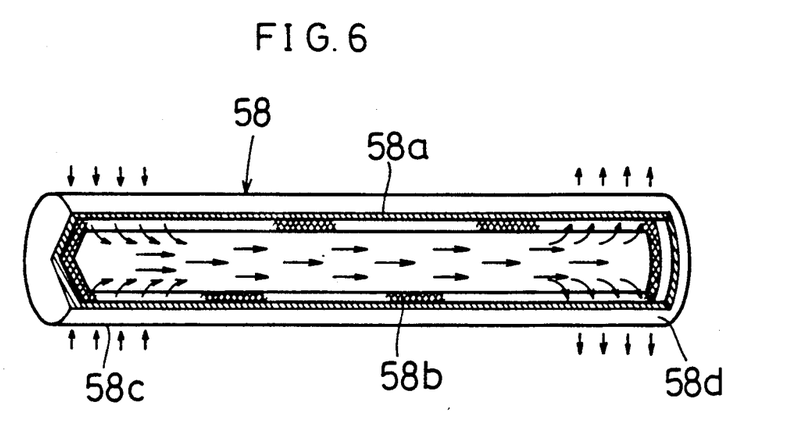
FIG. 6 is a perspective view of a heat pipe, partly broken away.

Explanation, now will be of the construction and the principle of operation of each heat pipe 58. As shown in FIG. 6, each heat pipe 58 comprises a container 58a which is a hermetically sealed pipe and a netlike wick 58b which carries out back flow of working liquid (water, for example) by capillary action. The container 58a is hermetically sealed by removing therefrom condensable gas such as the air. A proper quantity of working liquid is enclosed in the container 58a. Thus, space in the container 58a is filled with working liquid and its saturated steam. If heat is supplied at a heat-in portion 58c at one end, working liquid thereat evaporates and due to the difference in pressure between such heat-in portion 58c and a heat-out portion 58d (at an opposite end), a fluid stream moves at high speed to the heat-out portion 58d. The stream thus moved condenses at the inner wall of the heat-out portion 58d and discharges therethrough latent heat of evaporation. Thus, heat is changed into latent heat due to evaporation, movement and condensation of working liquid, and the latent heat is transmitted from the heat-in portion 58c to the heat-out portion 58d. Accordingly, different from normal solid heat transmission, large heat flux is obtained. Working liquid condensed at the heat-out portion 58d is returned to the heat-in portion 58c due to capillary action and thus evaporation and condensation are repeated and circulation in a closed circuit is formed.

In FIG. 3, reference numeral 59 designates a side bent grill arrangement at the side louver blowoff nozzle 52. By means of grill 59, the blowing direction of the air is adjustable to an upward direction or a downward direction.

Therefore, in the above embodiment when the air conditioner works and the blowing control thereof is set at a ventilation mode or a bi-level mode, the air (inside air or outside are) is drawn into the blower unit 21 by operation of the blower 24. This air is discharged from the blower unit 24, is cooled by the evaporator 30 of the cooler unit 28 and/or is heated by the heat core 33 of the heater unit 31, and then passes through the first duct 38 for ventilating and is blown toward a person in the driver compartment of the car through the center louver blowoff nozzles 38. In cooperation with the operation of the blower 24, each brushless fan 53 is put in an "ON" state such that inside air or the outside air passes through the respective second duct 45 and is blown into the car interior through the side louver blowoff nozzle 52.

In the case of this embodiment, the conditioned air flowing in the first duct 37 heats or cools each of the first head conductors 55 by heat exchange and this heat energy is transmitted to the respective second heat conductor 56 through the medium of the fins 57 of the heat conductor 55 and the respective heat pipe 58. Thus, the air in the second duct 45 having the heat conductor 56 is heated or cooled.

Since transfer of heat is carried out only by the conditioning air in the first duct 37 and to the conditioning air in the second duct 45 through the medium of the heat pipe 58 and the heat conductors 55, 56, even if the right and left second ducts 45 are spaced from the heater unit 31, it is not necessary to connect the ducts 45 to the first duct 37 located at the center of the instrument panel 1 by connecting ducts. Rather, heat transfer is achieved by the heat pipes 58. Thus, the space available in the instrument panel 1 for other ports, such as meters, steering fitting mechanism, glove box, etc., can be increased. Moreover, flexibility of the arrangement, layout, shape of the instrument panel itself, design, etc. can be improved.

Since the outside air introducing nozzle 46 of the second duct 45 is opened at an area or portion that it is subjected to travelling wind pressure, when the inside air/outside air switchover door 48 is switched to the outside air introducing state, it is possible to introduce the outside air into the car interior as travelling wind, without the necessity of operating the brushless fan 53.

Since each heat conductor 55, 56 comprises many fins 57 which are arranged in parallel with the blowing direction in the ducts 37, 45, heat exchange efficiency between the heat conductor 55, 56 and the conditioning air can be raised, without causing an increase of blowing resistance in the ducts 37, 45. Thus, the temperature of the conditioning air discharged from the second duct 45 can be heated or cooled to the same extent as the conditioning air from the first duct 37.

In the above embodiment, an explanation was made of an arrangement with two ventilating ducts 45 which do not communicate with the cooler unit 28 and the heater unit 31, in addition to the first ventilating duct 37 communicating with the cooler unit 28 and the heater unit 31. However, the number of ducts 45 can be reduced to one or increased to three or more.

In the above embodiment, the conditioning air to be blown toward the breast of a person in the car interior during a ventilating mode or bi-level mode was discussed. However, the present invention also is applicable to heating air during a heating mode, for example.

Figure 7:
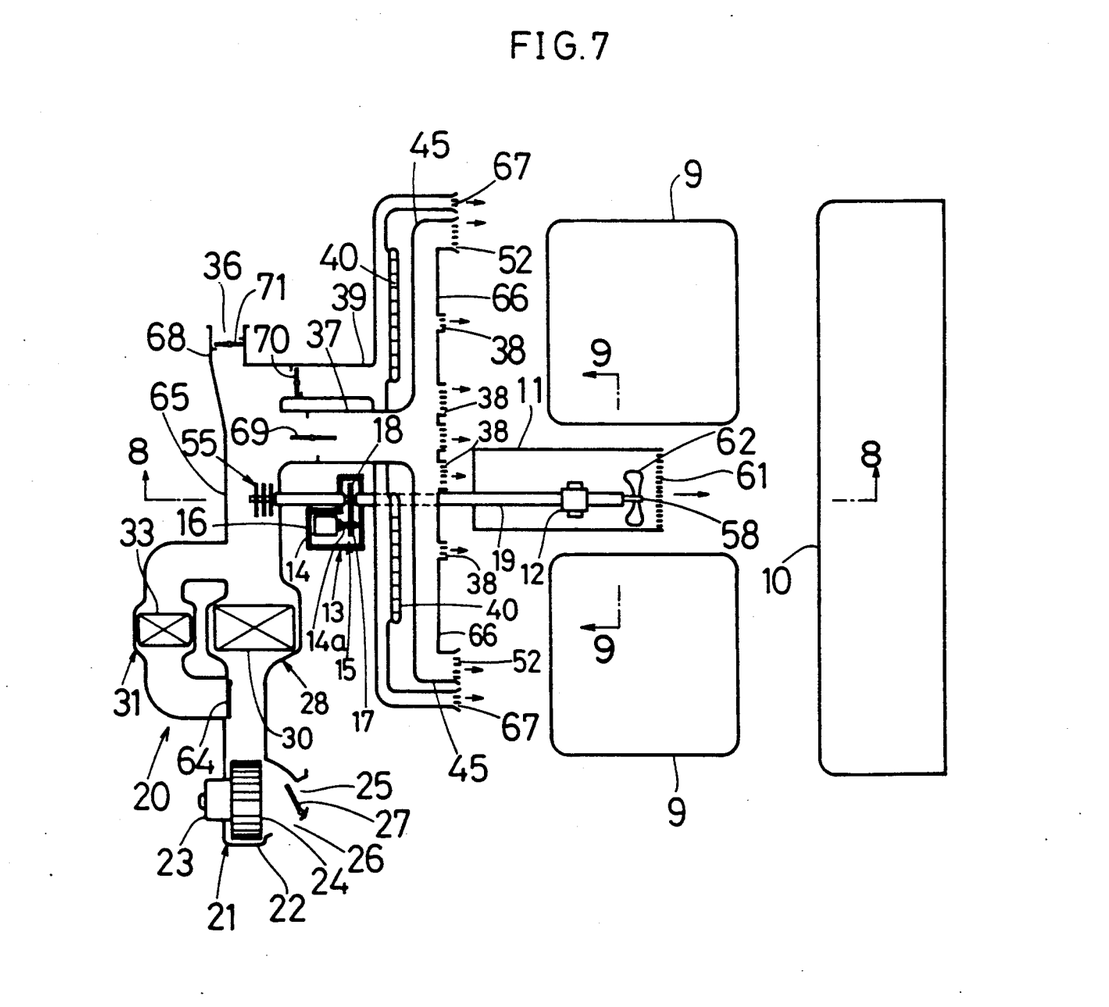
FIG. 7 is a cross section showing a typical composition of an air conditioner as a whole.
Figure 8:
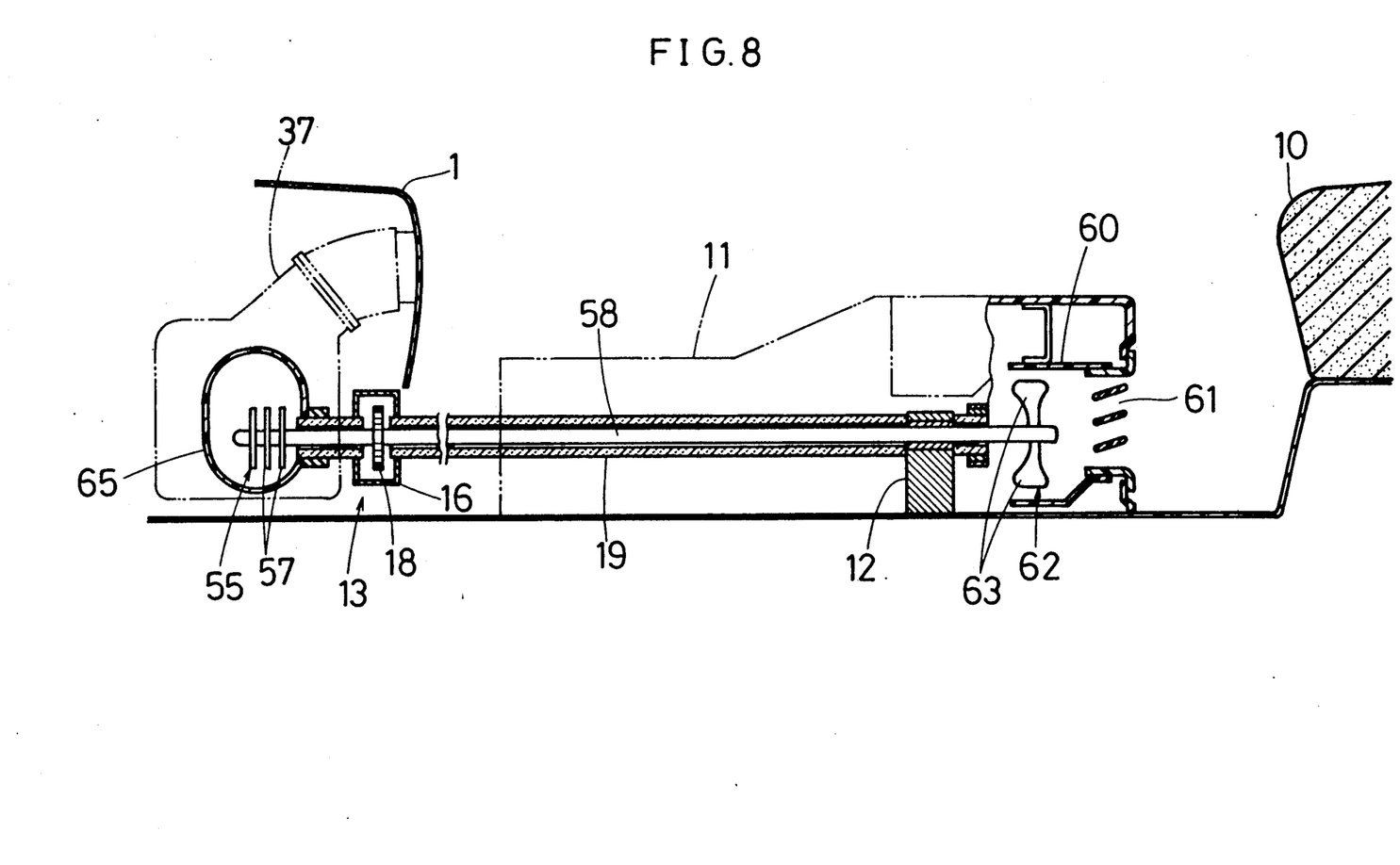
FIG. 8 is a cross section, on an enlarged scale, taken along the line 8—8 in FIG. 7.
Figure 9:
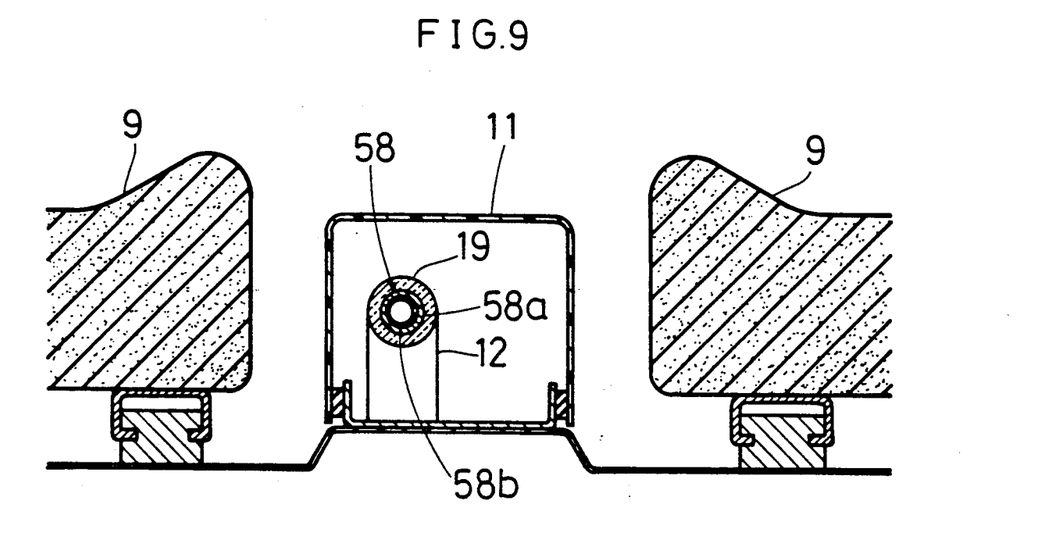
FIG. 9 is a cross section, on an enlarged scale, taken along the line 9—9 in FIG. 7.

FIG. 7 through to FIG. 9 show a second embodiment of the present invention. In this embodiment, it is intended to deliver conditioning air to a rear seat area of the interior of a car. In these figures, reference numeral 20 designates an air conditioning unit for a front seat. As the air conditioning unit 20 is similar to that of the foregoing embodiment in basic construction, like reference numerals are given to like parts as in the first embodiment and detailed description thereof is omitted. The air conditioning unit 20 comprises a blower unit 21 having a blower 24, a cooler unit 28 having an evaporator 30 and a heater unit 31 having a heater core 33. While the cooler unit 28 and the heater unit 31 are connected to the blower unit 21 in parallel, the evaporator 30 and the heater core 33 communicate selectively with the blower 34 by switching of switchover door or flap valve 64. The cooler unit 29 and the heater unit 31 join together at the downstream end of a duct 65 that is jointed and communicates with a first duct 37. Second ventilating ducts 45 are connected to the first duct 37 by connecting ducts 66, whereby conditioning air which is the same as conditioning air blown out through center louver blowoff nozzles 52. Connected in parallel to the downstream end of the duct 65 are a duct 39 for defrosting having defrosting blowoff nozzles 40 and side defrosting blowoff nozzles 67 and a heating duct 61 having a heat blowoff nozzle 36. By operation of the blower 24, outside air or inside air is introduced into the blower unit 21 from outside air introducing nozzle 25 or inside air introducing nozzle 26. The introduced air is cooled by the evaporator 30 or heated by the heater core 33 and then is blown out into the car interior through blowoff nozzles 36, 38, 40, 52, 67. Reference numerals 69-71 designate doors or flap valves for regulating of the conditioning air from the blowoff nozzles 36, 38, 40, 50, 67.

Reference numeral 9 designates left and right front seats provided at a front portion of the car interior. Reference numeral 10 designates a rear set provided at a rear portion of the car interior. A center console 11 which extends in the lengthwise direction of the car is provided at a floor surface between the two front seats 9. A duct 60 (FIG. 8) for the rear seats is provided as an auxiliary duct in the center console 11. A forward end of the duct 60 communicates with the car interior through an inside air introducing nozzle which opens at the upper surface or a side surface of the center console and at a rear end of the duct 60 a blowoff nozzle 61 opens toward a person to be seated on the rear seat 10.

Provided in the center console 11 is a heat pipe 58 extending in the lengthwise direction between the right and left front seats. This heat pipe 58 is positioned slightly shifted to the left side in relation to the center so that it does not interfere with a gear change lever and other elements in the center console 11. A forward end of the heat pipe 58 is located in the duct 65 in the air conditioning unit 20 and a rear end thereof is located in the duct 60 extending between the two front seats 9 toward the rear seat 10.

A bearing member 12 is provided in the center console 11 and a rear part of the heat pipe 58 is supported rotatably by the bearing member 12. A driving device 13 which rotates the heat pipe 58 is mounted in the instrument panel 1. The driving device 13 comprises an electric motor 14 and a gear mechanism 15 which transmits the rotation of the motor 14 to the heat pipe 58. The gear mechanism 15 comprises a gear case 16 which acts as a bearing to support rotatably a front side part of the heat pipe 58, a first gear 17 which is accommodated in the gear case 16 and is fitted to an output shaft 14a of the motor 14 and a second gear 18 which engages with the first gear 17 and is fitted to a front end portion of the heat pipe 58.

Heat conductor 55 consisting of a plurality of fins 57 is fitted rotatably to a forward end of the heat pipe 58. Fitted to a rear end of the heat pipe 58 is a blowing fan 62 (heat conductor) having the heat pipe 58 as an axis of rotation. The blowing fan 62 is composed of a plurality of blades 63 comprising heat conducting body fixed to the outer circumference of the heat pipe 58. When the heat pipe 58 is rotated by the driving device 13, the inside air is drawn into the duct 60 from the inside air introducing nozzle, is heated or cooled by the blades 63 of the blowing fan 62 and is discharged thereby through the blowoff nozzle 61 toward the rear seats.

An adiabatic pipe 19 is provided to surround the heat pipe 58 such that heat pipe 58 is relatively rotatable in relation thereto. Thus, adiabatic pipe 19 covers and protects heat pipe 58 in a heat-insulated state.

In this embodiment, therefore, the air taken into the blower unit 21 in the air conditioning unit 20 on the front seat 9 side is cooled or heated while it passes the cooler unit 28 or the heater unit 31, thus to form conditioning air of proper temperature. This conditioning air passes through the duct 65 and is blown out into the car interior through the blowoff nozzles 36, 38, 40, 52, 67. Since the heat conductor 55 is provided in the duct 65, the heat conductor 55 is cooled or heated by the conditioning air flowing in the duct 65. Heat energy given to the heat conductor 55 is transmitted, via the heat pipe 58, to the blowing fan 62 at the rear end of the heat pipe 58, whereby the fan 62 is cooled or heated.

When the heat pipe 58 and the fan 62 rotate by the operation of the motor 14 of the driving device 13, the inside air drawn through the inside air introducing nozzle into the duct 60 by the fan 62. This inside air heat-exchanges with the blowing fan 62 which is cooled or heated and becomes additional conditioning air of proper temperature, which is blown toward the rear seat 10 through the blowoff nozzle 61. Therefore, air conditioning in the area of the rear seat 10 is carried out efficiently and a feeling of comfort is imported to persons sitting on the rear seat 10. In this case, a connecting duct by which the air conditioning unit 20 communicates with the duct 60 is not necessary, and only sufficient space for the heat pipe 58 in the center console is necessary. Thus, a blowoff device for rear seats can be made smaller in size and in turn that space available for the car interior can be increased.

According to the present invention, even if blowoff ducts of an air conditioning unit for a vehicle are located apart from each other, a connecting duct for connecting such ducts can be dispensed with. Therefore, by reducing the space in the instrument panel required for ducts, the space available for other parts can be increased, the flexibility of arrangement and layout of such parts, the design and shape of instrument panel, etc., can be improved and available interior space can be increased.

What is claimed is:

1. An air conditioner for conditioning air and delivering such conditioned air to the interior of an automotive vehicle, said air conditioner comprising:
    at least one temperature conditioning means for conditioning the temperature of air to thereby form conditioned air;
    a first blowoff duct connected to receive the conditioned air directly from said conditioning means and to deliver the conditioned air directly into the interior of an automotive vehicle;
    at least one second blowoff duct positioned entirely independently of and totally out of communication with said first blowoff duct for delivering air independently of said first blowoff duct to the vehicle interior;
    a first heat conductor positioned in said first blowoff duct for conductive heat transfer with the conditioned air therein;
    a second heat conductor positioned in said second blowoff duct for conductive heat transfer with the air therein; and
    a heat pipe connected to and extending between said first and second heat conductors for conducting heat therebetween and thereby for temperature conditioning the air in said second blowoff duct by conductive heat transfer along said heat pipe between one of said heat conductors and the other of said heat conductors.

2. An air conditioner as claimed in claim 1, wherein said first and second blowoff ducts extend parallel to each other in directions to be lengthwise of the vehicle.

3. An air conditioner as claimed in claim 2, wherein said heat pipe extends in a direction to be widthwise of the vehicle.

4. An air conditioner as claimed in clam 1, further comprising an instrument panel to be positioned at a front portion of the vehicle interior, and wherein said first and second blowoff ducts extend through said instrument panel to deliver temperature conditioned air into the front portion of the vehicle interior, and said heat pipe is positioned within said instrument panel in a direction to be widthwise of the vehicle.

5. An air conditioner as claimed in claim 4, wherein said first blowoff duct opens into the vehicle interior at a position approximately centrally of said instrument panel in a direction thereof to be widthwise of the vehicle.

6. An air conditioner as claimed in claim 5, comprising two said second blowoff ducts positioned to open into the vehicle interior at opposite ends of said instrument panel, each said second blowoff duct having positioned therein a respective said second heat conductor and having extending therefrom a respective said heat pipe.

7. An air conditioner as claimed in claim 1, wherein each said heat conductor has a fin-shaped configuration including a plurality of fins.

8. An air conditioner as claimed in claim 7, wherein said fins are positioned to extend parallel to the flow of air in the respective said blowoff ducts.

9. An air conditioner as claimed in claim 1, wherein said second blowoff duct has an upstream end to be open to the exterior of the vehicle and to be subjected to exterior wind pressure during driving of the vehicle.

10. An air conditioner as claimed in claim 9, further comprising a blowing fan located within said second blowoff duct for discharging air therefrom into the vehicle interior.

11. An air conditioner as claimed in clam 10, wherein said second blowoff duct has therein, at a position upstream of said second heat conductor and said blowing fan, an inlet to be opened to the vehicle interior.

12. An air conditioner as claimed in claim 11, further comprising a flap valve positioned in said second blowoff duct for selectively allowing introduction therein of exterior air through said upstream end or interior air through said inlet.

13. An air conditioner as claimed in claim 1, wherein said temperature conditioning means and said first blowoff duct are to be positioned in a front portion of the vehicle interior, said second blowoff duct is to be positioned in a rear portion of the vehicle interior, and said heat pipe extends in a direction to be lengthwise of the vehicle.

14. An air conditioner as claimed in claim 13, wherein said heat pipe is adapted to extend rearwardly between left and right front seats of the vehicle toward a rear seat thereof.

15. An air conditioner as claimed in claim 13, further comprising means for rotatably supporting said heat pipe within the vehicle interior.

16. An air conditioner as claimed in claim 15, further comprising means for rotating said heat pipe.

17. An air conditioner as claimed in claim 16, wherein said second heat conductor comprises a blowing fan mounting on a rear end of said heat pipe.

18. An air conditioner as claimed in claim 17, wherein said second blowoff duct includes at a downstream rear end thereof a blowoff nozzle to open toward a rear seat of the vehicle.

19. An air conditioner as claimed in claim 1, wherein said at least one temperature conditioning means comprises an air conditioning unit to be mounted in a front part of the vehicle and including an air heating unit, an air cooling unit and a blower unit for delivering conditioned air through the first blowoff duct into the vehicle interior.

20. An air conditioner as claimed in claim 1, further comprising means for rotatably supporting said heat pipe within the vehicle interior.

21. An air conditioner as claimed in claim 20, further comprising means for rotating said heat pipe.

22. An air conditioner as claimed in claim 21, wherein said second heat conductor comprises a blowing fan mounted on a rear end of said heat pipe.

* * * * *